(12) United States Patent
Hasebe

(10) Patent No.: US 6,422,594 B2
(45) Date of Patent: Jul. 23, 2002

(54) AIRBAG APPARATUS

(75) Inventor: Masahiro Hasebe, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/810,346

(22) Filed: Mar. 19, 2001

Related U.S. Application Data

(60) Provisional application No. 60/190,022, filed on Mar. 17, 2000, and provisional application No. 60/207,185, filed on May 26, 2000.

(51) Int. Cl.⁷ .............................................. B60R 21/20
(52) U.S. Cl. ...................... 280/731; 200/61.55; 74/552; 280/728.2
(58) Field of Search .............................. 280/731, 728.2; 200/61.55, 61.54; 74/552

(56) References Cited

U.S. PATENT DOCUMENTS

| | | | |
|---|---|---|---|
| 5,303,952 A | * 4/1994 | Shermetarto et al. | 280/731 |
| 5,459,294 A | * 10/1995 | Danielson | 200/61.54 |
| 5,927,746 A | * 7/1999 | Komiyama et al. | 280/728.2 |
| 5,950,494 A | * 9/1999 | Sugiyama | 74/552 |
| 6,139,051 A | 10/2000 | Fujita | 280/731 |
| 6,161,863 A | 12/2000 | Fujita et al. | 280/728.2 |

FOREIGN PATENT DOCUMENTS

| | | |
|---|---|---|
| EP | 0 827 878 A2 * | 3/1998 |
| EP | 0 887 239 A2 * | 6/1998 |
| JP | 10-106382 | 4/1998 |
| JP | 11-42997 A * | 2/1999 |
| WO | WO 94/11230 * | 5/1994 |

* cited by examiner

Primary Examiner—Paul N. Dickson
Assistant Examiner—Ruth Ilan
(74) Attorney, Agent, or Firm—Foley & Lardner

(57) ABSTRACT

An bag apparatus of which the entire body or the module cover moves smoothly and is easily positioned with high accuracy is provided. The air bag apparatus is disposed at the central region of the steering wheel, and includes a module cover having three attaching portions. In addition, horn switches are disposed under the attaching portions. Each of the horn switches includes a movable terminal having a guide hole. The three horn switches are disposed at vertexes of a triangle. The opening of each of the horn switches extends perpendicularly to the line which passes through between the other two horn switches.

13 Claims, 9 Drawing Sheets

US 6,422,594 B2

AIRBAG APPARATUS

CROSS REFERENCE TO RELATED APPLICATIONS

The present application claims priority to and the benefit of the following U.S. Provisional Patent Applications:

Ser. No. 60/190,022 filed Mar. 17, 2000; and

Ser. No. 60/207,185 filed May 26, 2000

The foregoing provisional applications are incorporated by reference herein in their entirety.

BACKGROUND OF THE INVENTION

The present invention relates to air bag apparatuses mounted in vehicles, etc., and more specifically relates to an air bag apparatus for a driver's seat which has horn switches.

Generally, air bag apparatuses for driver's seats of vehicles include an air bag which is folded and is fixed to a retainer (also referred to as a container, etc.) at an end thereof, and a module cover which is attached to the retainer for covering the folded air bag. In addition, an inflator (gas generator), which generates a gas for inflating the air bag, is usually attached to the retainer. When a vehicle collides, the inflator generates a gas and starts to inflate the air bag. Then, the module cover breaks and opens, and the air bag expands toward the driver.

The module cover is provided with a tear line (also referred to as a thinned portion or as a weakened portion), along which the module cover breaks and opens when it is pressed from behind by the inflated air bag.

FIG. 12 and FIG. 13 are perspective views of steering wheels containing conventional air bag apparatuses. In the figures, the upper sides of the steering wheels are not shown. With reference to the figures, air bag apparatuses 2A and 2B are contained inside steering wheels 1. Module covers 3A and 3B of the air bag apparatuses 2A and 2B, respectively, are provided with attaching portions 4 which are attached to spoke portions 1a of the steering wheels 1. The air bag apparatus 2A has four attaching portions 4, and the air bag apparatus 2B has three attaching portions 4. In addition, each of the module covers 3A and 3B has tear lines 5.

In certain air bag apparatuses for driver's seats as described above, horn switches are triggered and a horn is activated by pressing the module cover. There are two types of air bag apparatuses with such horn switches. In one type, the entire body of the air bag apparatus moves backward, and in the other type, only the module cover moves backward.

If the central region of the air bag apparatus is pressed to activate the horn, the entire air bag apparatus or only the module cover moves backward uniformly over the entire region thereof. However, typically a region near the periphery of the air bag apparatus is pressed, so that only the side at which the module cover is pressed moves backward, and the other side moves only slightly. As a result, the air bag apparatus tilts.

Accordingly, guide holes, which are provided for guiding the movement of the air bag apparatus or only the module cover, must have sufficient diameters so that, regardless of the direction in which the air bag apparatus tilts, guiding shafts do not knock against the inner walls of the guide holes.

When the guide holes have large diameters, however, the positional accuracy of the air bag apparatus or of the module cover is degraded. Thus, displacement between the attaching portions and the spoke portions of the steering wheel occur.

Accordingly, an object of the present invention is to provide an air bag apparatus which does not cause the above-described displacement, and of which the entire body or the module cover is easily positioned with high accuracy.

SUMMARY OF THE INVENTION

According to one aspect of the present invention, a driver-seat air bag apparatus is contained in a steering wheel, and comprises three horn switches which are circularly disposed at three positions in the steering wheel, each of the horn switches including a movable member which is provided with an opening and a contacting point, and which moves, when the air bag is pressed, in the direction in which the air bag is pressed; a guide shaft which is inserted through the opening and which guides the movement of the movable member; and a biasing member which applies biasing force to the movable member in the direction opposite to the direction in which the air bag is pressed. The opening in each of the horn switches is formed as an oblong hole which extends perpendicularly to a line which passes through between the other two horn switches.

When the air bag apparatus or the module cover is pressed and moves backward, the guide shaft moves inside the opening (guide hole) of the movable member. At this time, according to the present invention, the guide shaft in each of the horn switches moves perpendicularly to the line which passes through the other two horn switches. Thus, it is only necessary that the guide hole extends in this direction.

According to the above-described air bag apparatus in which the guide hole in each of the horn switches is formed as an oblong hole, the air bag apparatus or the module cover is positioned with high accuracy in the lateral direction of the guide hole. Thus, the displacement between the attaching portions of the module cover and the spoke portions of the steering wheel is prevented.

In addition, according to another aspect of the present invention, a driver-seat air bag apparatus is contained in a steering wheel, and comprises three horn switches which are circularly disposed at three positions in the steering wheel, each of the horn switches including a movable member which is provided with a contacting point, and which moves, when the air bag apparatus is pressed; in the direction in which the air bag is pressed, a guide shaft which is fixed to the movable member and which moves along with the movable member; a fixed portion which is provided with an opening through which the guide shaft is inserted, and a biasing member which applies biasing force to the movable member in the direction opposite to the direction in which the air bag is pressed. The opening in each of the horn switches is formed as an oblong hole which extends perpendicularly to a line which passes through between the other two horn switches.

Also in such an air bag apparatus, the opening (guide hole) in each of the horn switches is formed as an oblong hole. Accordingly, the air bag apparatus or the module cover is positioned with high accuracy in the lateral direction of the guide hole. Thus, the displacement between the attaching portions of the module cover and the spoke portions of the steering wheel are prevented.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
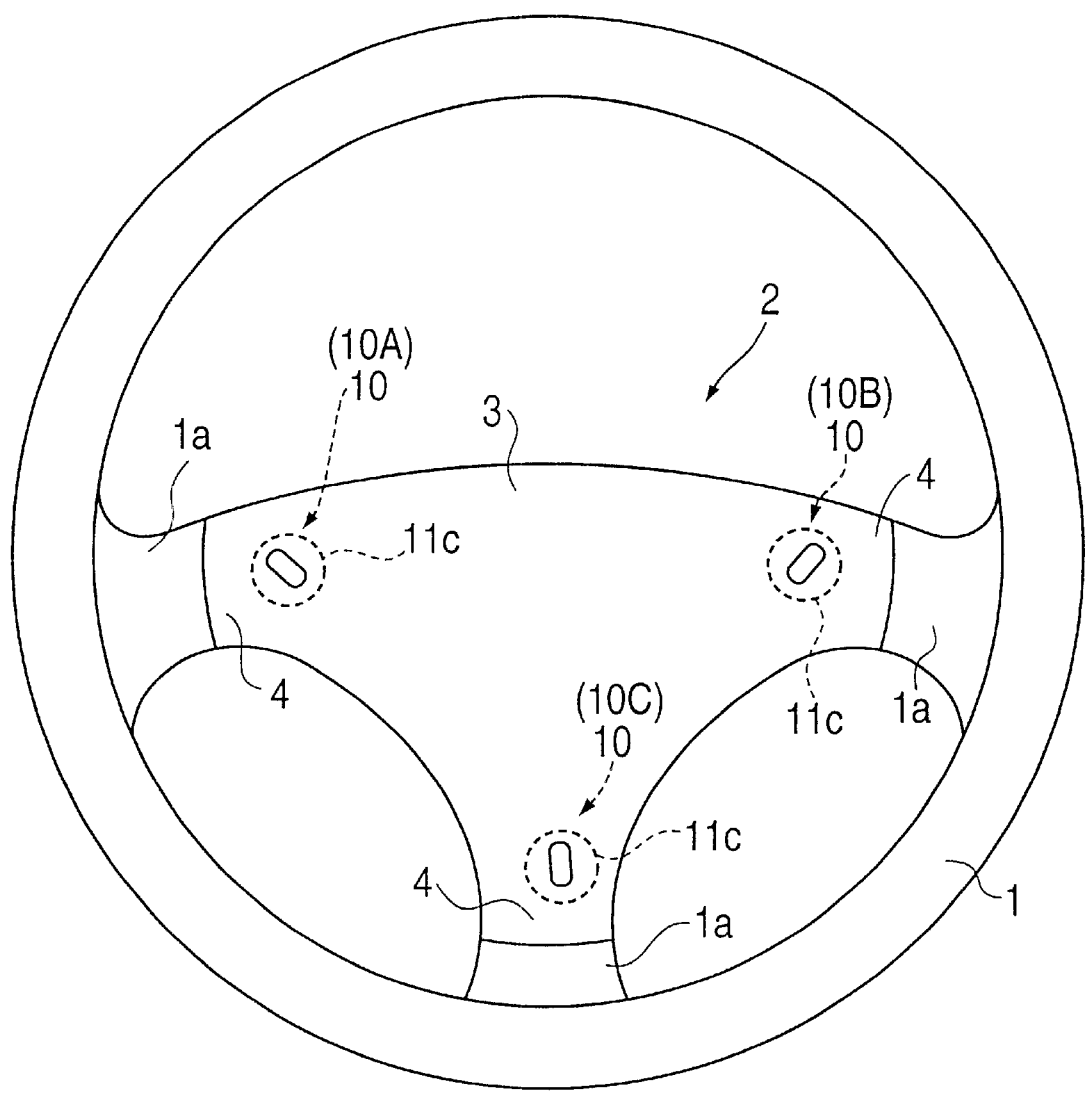
FIG. 1 is a front view of a steering wheel containing an air bag apparatus according to an embodiment of the present invention.
Figure 2:
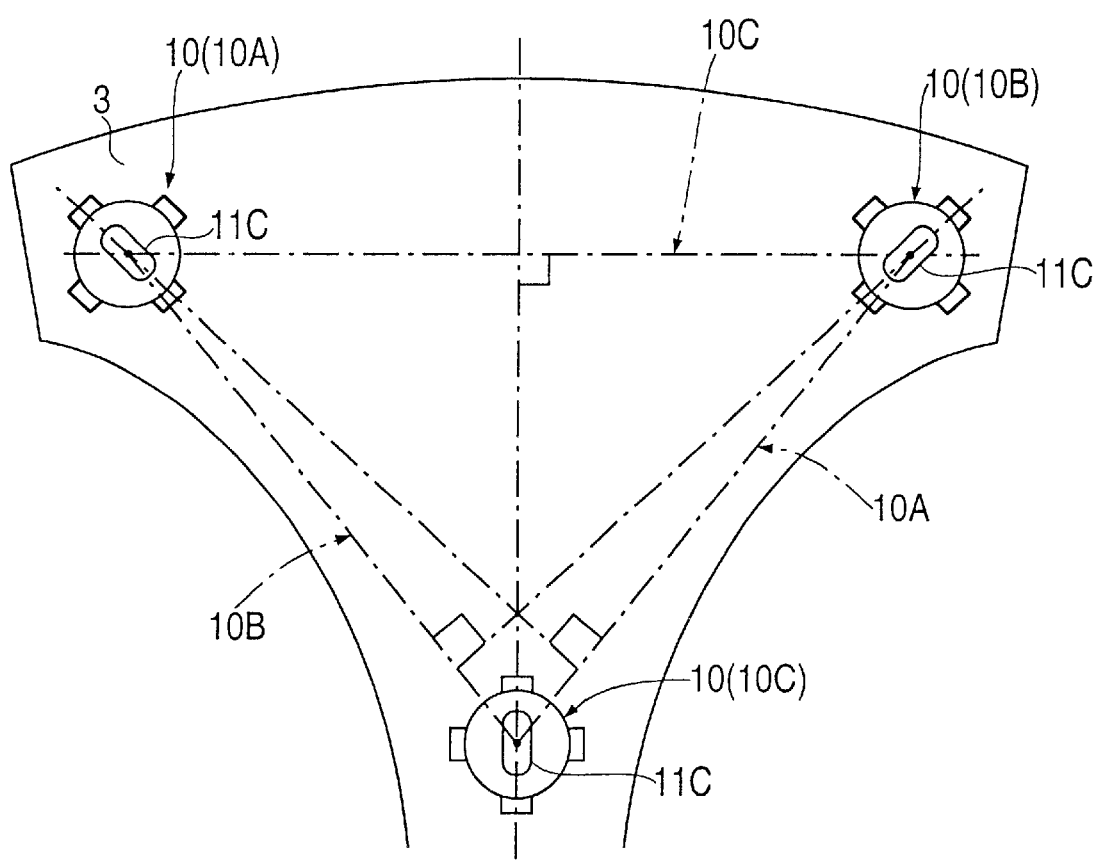
FIG. 2 is a perspective view which shows a construction of the air bag apparatus shown in FIG. 1, from which a module cover is removed.
Figure 3:
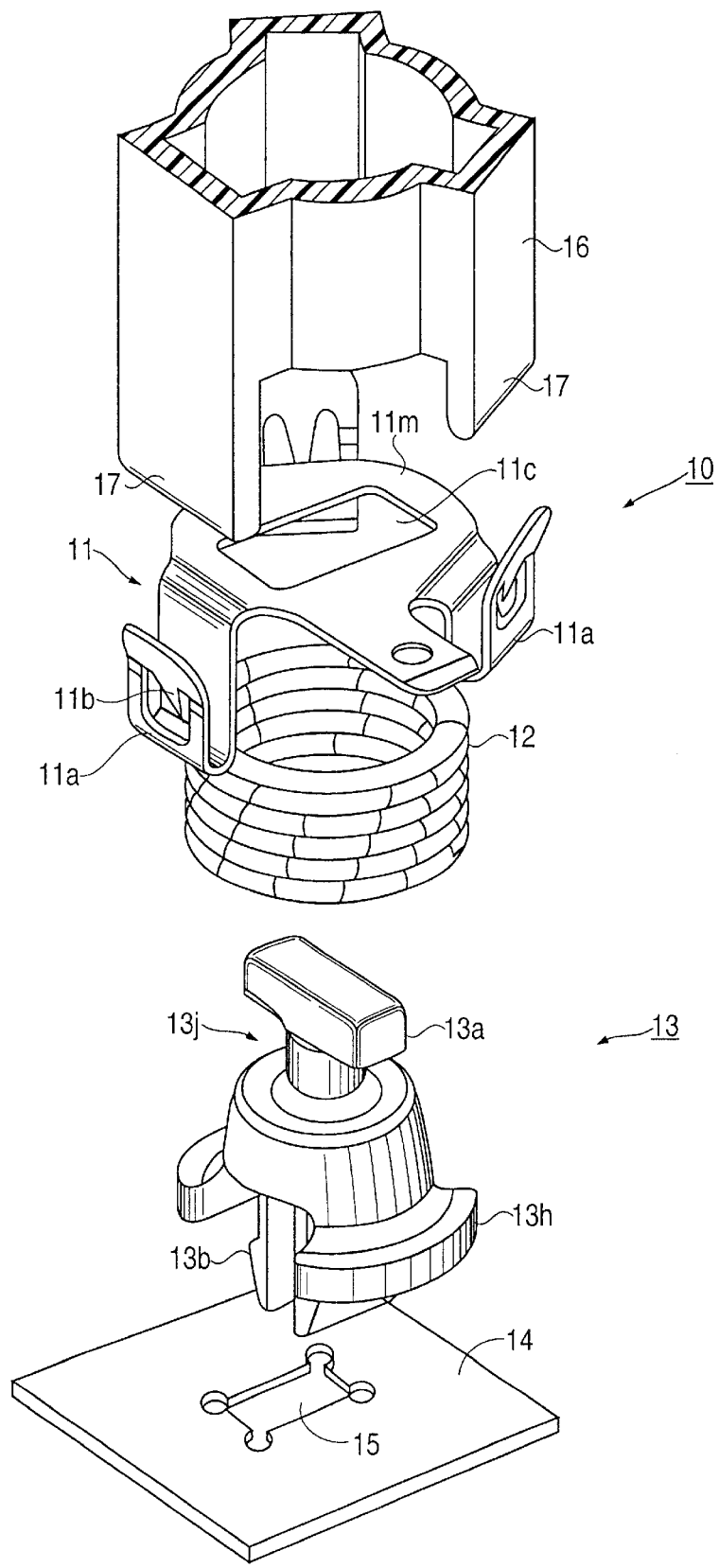
FIG. 3 is an exploded perspective view of a horn switch.
Figure 4:
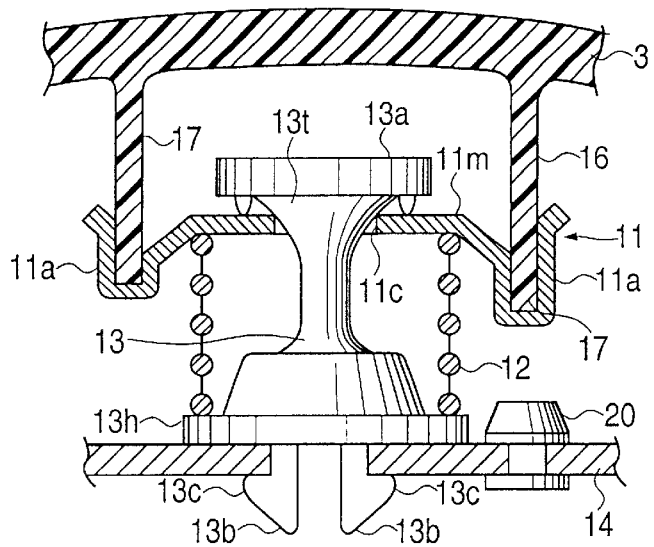
FIG. 4 is a sectional view of the horn switch shown in FIG. 3.

Embodiments of the present invention will be described below with reference to the accompanying drawings. FIG. 1 is a front view of a steering wheel containing an air bag apparatus according to an embodiment of the present invention. FIG. 2 is a perspective view which shows a construction of the air bag apparatus from which a module cover is removed. FIG. 3 is an exploded perspective view of a horn switch, and FIG. 4 and FIG. 5 are explanatory drawings for explaining the operation of the horn switch.

The air bag apparatus 2 is disposed at the central region of the steering wheel 1, and includes the module cover 3 having three attaching portions 4, which are attached to three spoke portions 1a of the steering wheel 1. In addition, horn switches 10 are disposed under the attaching portions 4 of the module cover 3.

Each of the horn switches 10 includes a fixed terminal 20, a movable terminal 11, a coil spring 12, and a guide shaft 13. The fixed terminal 20 is fixed to a horn plate 14, and the movable terminal 11 is attached to the module cover 3. In addition, the coil spring 12 applies force to the movable terminal 11 and to the coil spring 12 in the opposite directions, and the guide shaft 13 guides the movement of the movable terminal 11. The construction may also be such that the fixed terminal 20 is omitted, and the moveable terminal 11 directly contacts the horn plate 14.

The movable terminal 11 includes a main plate 11m, a guide hole 11c, and clamp portions 11a. The main plate 11m faces the bottom surface of the module cover 3, and the guide hole 11c is an oblong hole formed at the center of the main plate 11m. In addition, the clamp portions 11a are formed at the periphery of the main plate 11m.

The clamp portions 11a have an approximate U-shape and strongly clamp protruding tabs 17. The protruding tabs 17 are formed at the lower end of a rod portion 16, which extends from the bottom surface of the module cover 3. In addition, claw portions 11b are engaged with the protruding tabs 17, so that the movable terminal 11 is strongly fixed to the module cover 3.

The guide shaft 13 includes a first stopper 13a, a second stopper 13h, a shank portion 13j, a taper portion 13t, and a pair of leg portions 13b. The first stopper 13a is positioned above the movable terminal 11, and the second stopper 13h is mounted on the horn plate 14. The shank portion 13j connects the first and the second stoppers 13a and 13h, and the taper portion 13t is formed at the connecting part of the shank portion 13j and the first stopper 13a. In addition, the leg portions 13b project downward from the bottom surface of the second stopper 13h. The diameter of the taper portion 13t increases toward the first stopper 13a, and the exterior surface thereof curves inward.

The leg portions 13b are inserted through an attachment hole 15 formed in the horn plate 14. The guide shaft 13, including the leg portions 13b, is integrally formed of an insulating plastic.

The pair of leg portions 13b can be elastically deformed toward and away from each other. In addition, the leg portions 13b are provided with projections 13c at the outwardly facing surfaces thereof (surfaces opposite to the surfaces facing each other). When the leg portions 13b are inserted into the attachment hole 15, the leg portions 13b are first bent so that they move toward each other. After the projections 13c are passed through the attachment hole 15, the leg portions 13b move back to the initial positions by elastic force. Accordingly, the projections 13c and the second stopper 13h sandwich the horn plate 14 at the periphery of the attachment hole 15, so that the guide shaft 13 is connected to the horn plate 14.

The coil spring 12 is disposed in a compressed manner between the movable terminal 11 and the second stopper 13h of the guide shaft 13, constantly pressing the movable terminal 11 upward.

As shown in FIG. 4, the movable terminal 11 normally receives opposing force from the coil spring 12 and is pressed upward toward the first stopper 13a. The guide shaft 13 is fitted inside an opening 11c, which is formed in the movable terminal 11.

Figure 5A:
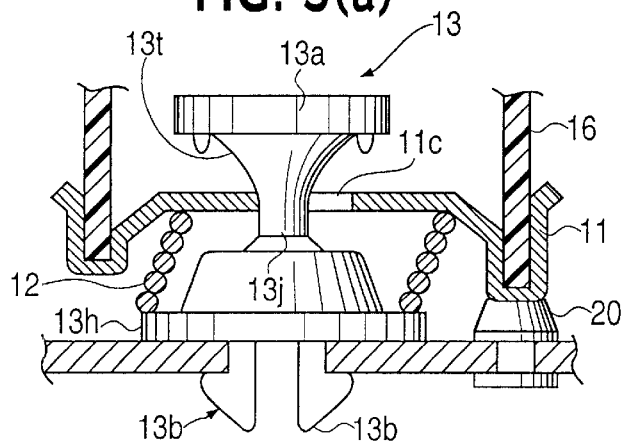
FIG. 5(a) and FIG. 5(b) are explanatory views of the operation of the horn switch shown in FIG. 3.
Figure 5B:
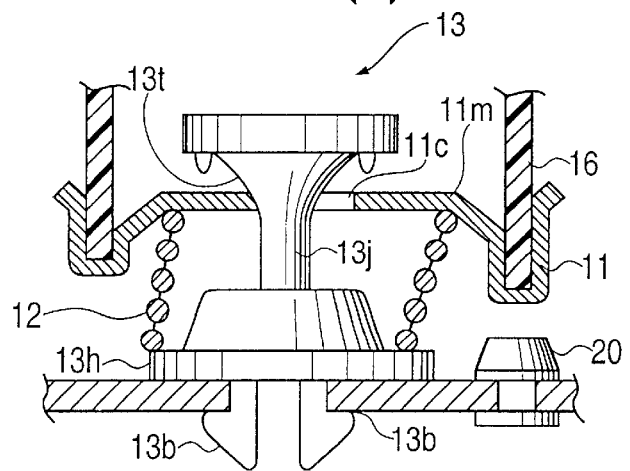

When the module cover 3 is pressed downward as shown in FIG. 5(a) and is then released, it moves upward as shown in FIG. 5(b) while the movement of the movable terminal 11 is guided by the taper portion 13t of the guide shaft 13. Then, after some time, the module cover 3 returns to the normal position as shown in FIG. 4. Accordingly, the module cover 3 returns to its regular position.

As shown in FIG. 1 and FIG. 2, the three horn switches 10 (10A, 10B, 10C) are positioned at vertexes of a triangle. In addition, the opening 11c in the movable terminal 11 of the horn switch 10A extends perpendicularly to the line which passes through the horn switches 10B and 10C. Similarly, the opening 11c in the movable terminal 11 of the horn switch 110B extends perpendicularly to the line which passes through between the horn switches 10C and 10A, and the opening 11c in the movable terminal 11 of the horn switch 10C extends perpendicularly to the line which passes through between the horn switches 10A and 10B.

When the horn switch 10A is pressed, the module cover 3 rotates around the line which passes through between the horn switches 10B and 10C. Similarly, when the horn switch 10B is pressed, the module cover 3 rotates around the line which passes through the horn switches 10C and 10A, and when the horn switch 10C is pressed, the module cover 3 rotates around the line which passes through between the horn switches 10A and 10B.

As described above, each of the openings 11c of the horn switches 10A, 10B, and 10C extends perpendicularly to each of the rotational axes. Thus, with respect to each of the horn switches 10A, 10B, and 10C, the guide shaft 13 moves in the longitudinal direction of the opening 11c when the module cover 3 rotates. Thus, the rotation of the module cover 3 is not impeded when the openings 11c are oblong holes as opposed to large-diameter holes. Since the openings 11c are formed as oblong holes, the guide shafts 13 are restrained in the lateral direction of the openings 11c. Accordingly, the module cover 3 is positioned against the spoke portions 1a with high accuracy, and the displacement between the module cover 3 and the spoke portions 1a is prevented.

Figure 6:
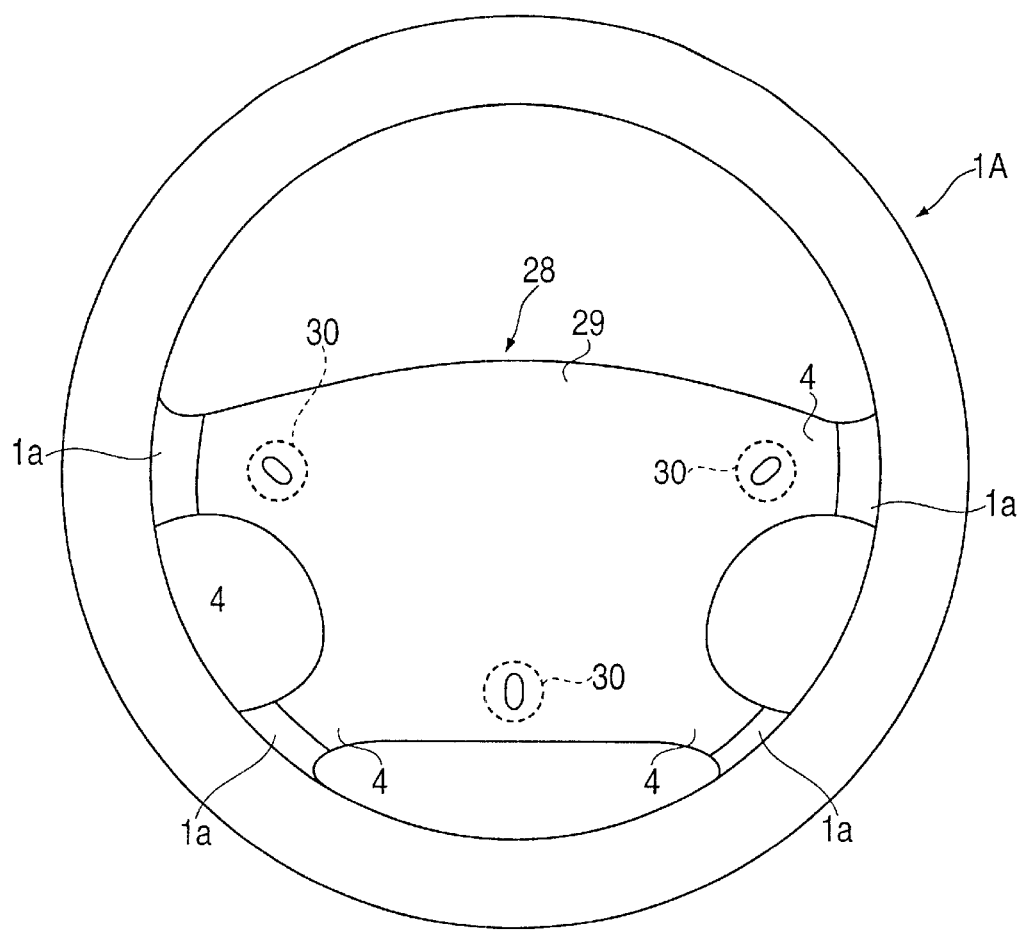
FIG. 6 is a front view of a steering wheel according to another embodiment of the present invention.
Figure 7:
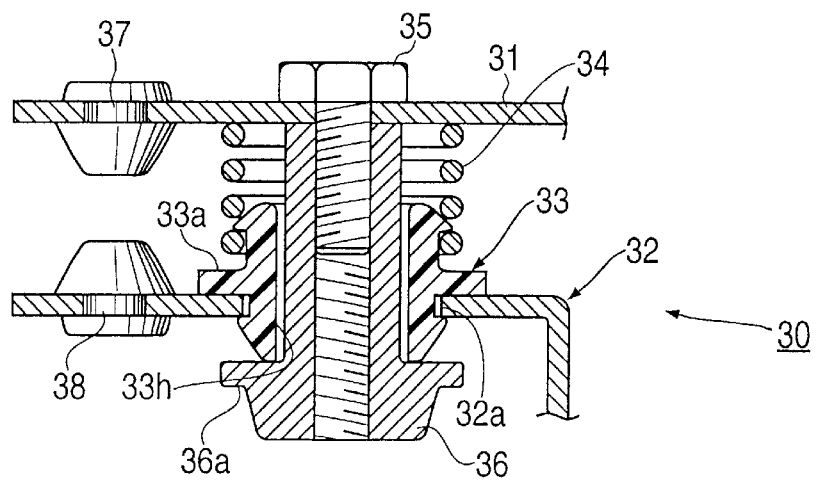
FIG. 7 is a sectional view of a horn switch.

FIG. 6 is a front view of a four-spoke-type steering wheel containing an air bag apparatus according to another embodiment of the present invention, and FIG. 7 is a sectional view of a horn switch included in the air bag apparatus. When the air bag apparatus 28 is pressed in order to activate a horn, the entire body thereof moves backward away from the driver.

The air bag apparatus 28 is contained in the steering wheel 1A, and includes a module cover 29 having four attaching portions 4, which are attached to four spoke portions 1a.

The air bag apparatus 28 also includes a retainer, an air bag which is attached to the retainer, a module cover 29 for covering the air bag, an inflator, and three horn switches 30. The retainer is provided with a protruding portion 31 which extends horizontally from the periphery thereof, and the horn switches 30 are disposed between the protruding portion 31 and a horn plate 32. The horn plate 32 is fixed to the steering wheel 1A.

Each of the horn switches 30 includes an annular insulating portion (guiding portion) 33, a coil spring 34, a bolt 35, a long nut (guide shaft) 36, a movable electrode 37, and a fixed electrode 38. The insulating portion 33 is provided with a flange portion 33a, and is engaged with an opening 32a of the horn plate 32. The coil spring 34 is disposed in a compressed manner between the flange portion 33a of the insulating portion 33 and the protruding portion 31 of the retainer. The bolt 35 is fixed to the protruding portion 31 by welding, etc. In addition, the bolt 35 extends downward in FIG. 7, and is screwed into the long nut 36. The long nut 36 is disposed inside an opening 33h of the insulating portion 33, and is provided with a flange portion 36a. The movable electrode 37 is fixed to the protruding portion 31 of the retainer, and the electrode 38 is fixed to the horn plate 32.

The horn switches 30 are arranged in a similar manner to the above-described horn switches 10. In addition, with respect to each of the horn switches 30, the opening 33h of the insulating portion 33 is shaped in the similar manner to the opening 11c. More specifically, the opening 33h of each of the horn switches 30 extends perpendicularly to the line which passes through between the other two horn switches 30.

Accordingly, the air bag apparatus 28 moves smoothly when it is pressed. In addition, in each of the horn switches 30, the opening 33h, which is formed as an oblong hole, and the long nut 36, which serves as a guide shaft, are engaged with each other. Thus, air bag apparatus 28 is positioned with high accuracy.

The air bag apparatus 28 shown in FIG. 6 and FIG. 7 is a four-spoke-type air bag apparatus of which the entire body moves when it is pressed. As shown in FIG. 8 to FIG. 11, however, the present invention may also be applied to a four-spoke-type air bag apparatus of which only a module cover moves.

Figure 8:
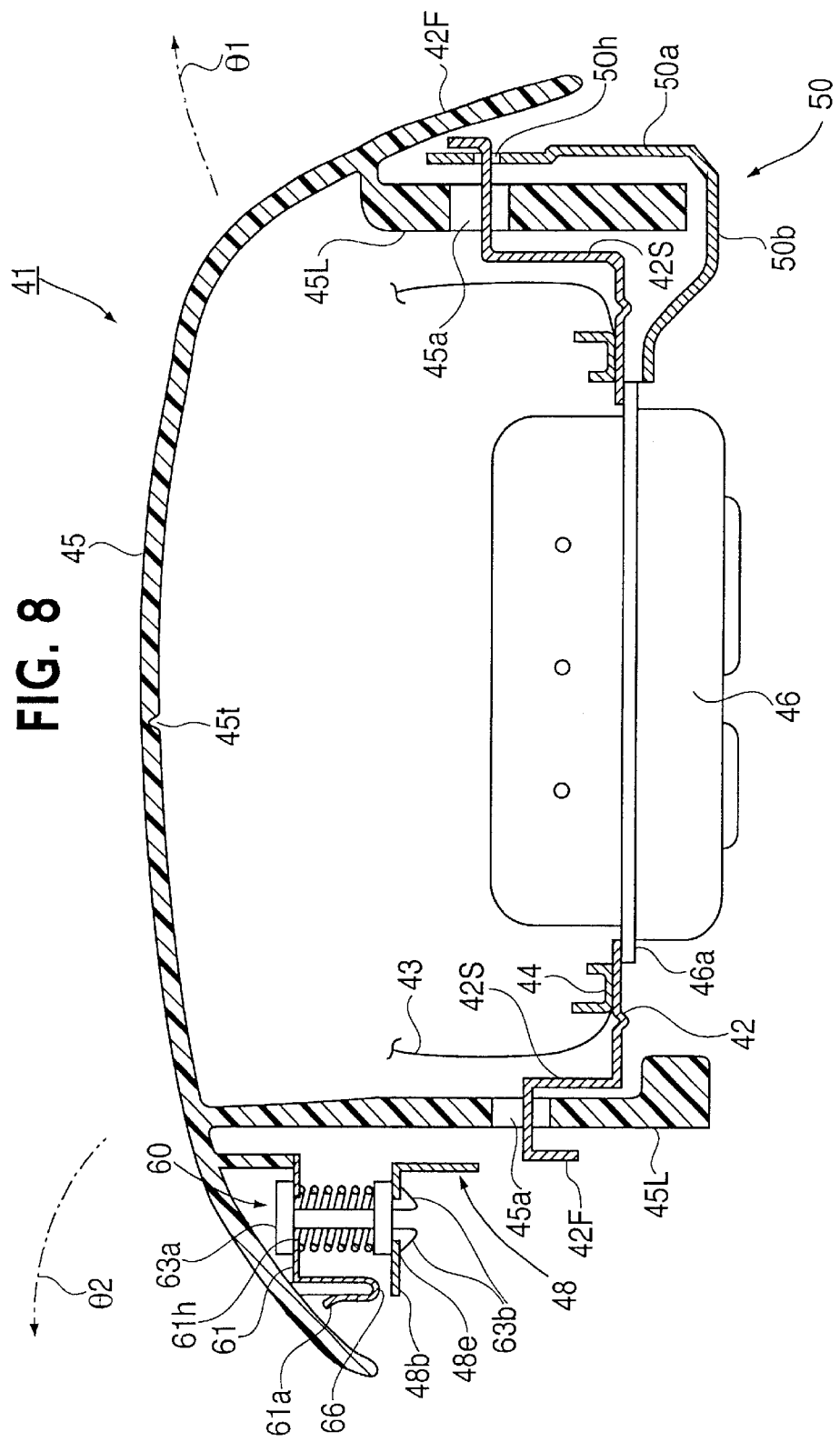
FIG. 8 is a sectional view of an air bag apparatus shown in FIG. 9, which is cut along line XIII—XIII, according to another embodiment of the present invention.
Figure 9:
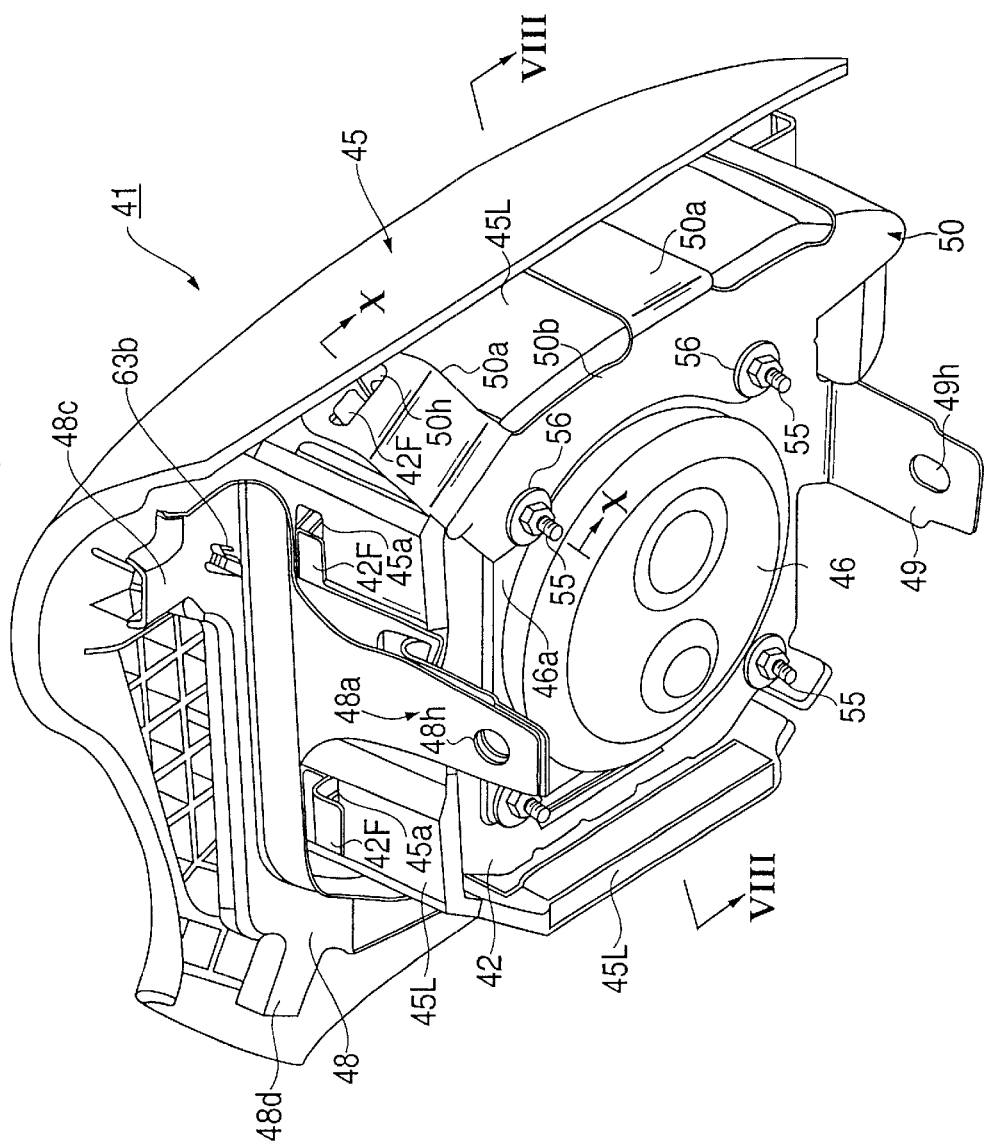
FIG. 9 is a perspective view of the air bag apparatus shown in FIG. 8.
Figure 10:
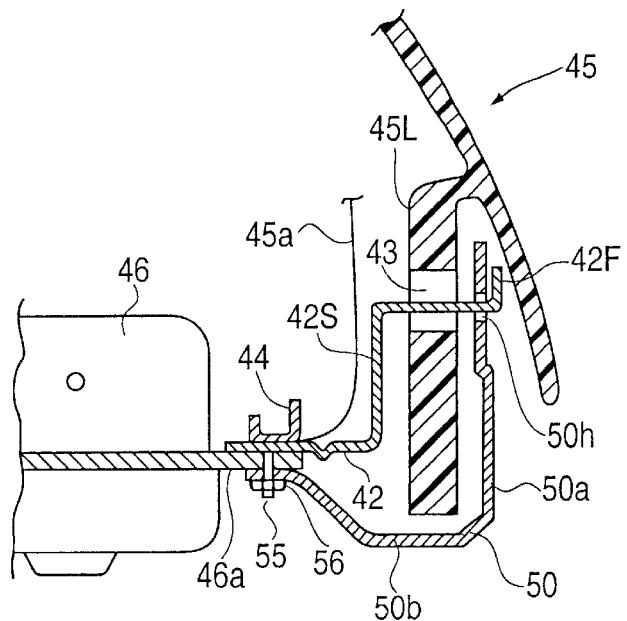
FIG. 10 is a sectional view of FIG. 9, which is cut along line X—X.

As shown in FIG. 8, the air bag apparatus 41 includes a retainer 42, an air bag 43 which is attached to the retainer 42 by an attachment ring 44, an inflator 46 for inflating the air bag 43, and a module cover 45 which covers the folded air bag 43. The module cover 45 is provided with a tear line 45t. When the air bag 43 is inflated by the inflator 46, the module cover 45 breaks along the tear line 45t to open in the directions $\theta_1$ and $\theta_2$, as shown in FIG. 8.

The module cover 45 is provided with leg portions 45L which are integrally formed with the module cover 45 and which protrudes from the bottom surface thereof. In addition, the retainer 42 is bent at the ends thereof, forming side wall portions 42S and hook portions 42F. The hook portions 42F are inserted through openings 45a formed in the leg portions 45L.

The hook portions 42F extend from the side wall portions 42S, and are bent outward in an L-shape. The leg portions 45L are disposed outside the side wall portions 42S with predetermined distances therebetween. In addition, a restraining member 50 is disposed along one of the leg portions 45L to prevent the leg portion 45L from moving away from the opposing side wall portion 42S.

The restraining member 50 includes upright wall portions 50a, which face the outwardly facing surface of one of the leg portions 45L, and a bottom portion 50b, which is disposed under the retainer 42. The upright wall portions 50a are provided with openings 50h, through which the hook portions 42F are inserted. The bottom portion 50b is provided with holes for receiving bolts 55, which will be described below.

The inflator 46 is provided with a flange portion 46a. The bolts 55, which project from the attachment ring 44, are inserted through the retainer 42 and through the flange portion 46a, and are screwed into nuts 56. Accordingly, the inflator 46 and the air bag 43 are fixed to the retainer 42.

Certain bolts 55 are also inserted through the bottom portion 50b of the restraining member 50. Thus, the restraining member 50 is also fixed to the retainer 42.

The shape in which the air bag 43 is folded is maintained by a shape-maintaining member (not shown).

Figure 11:
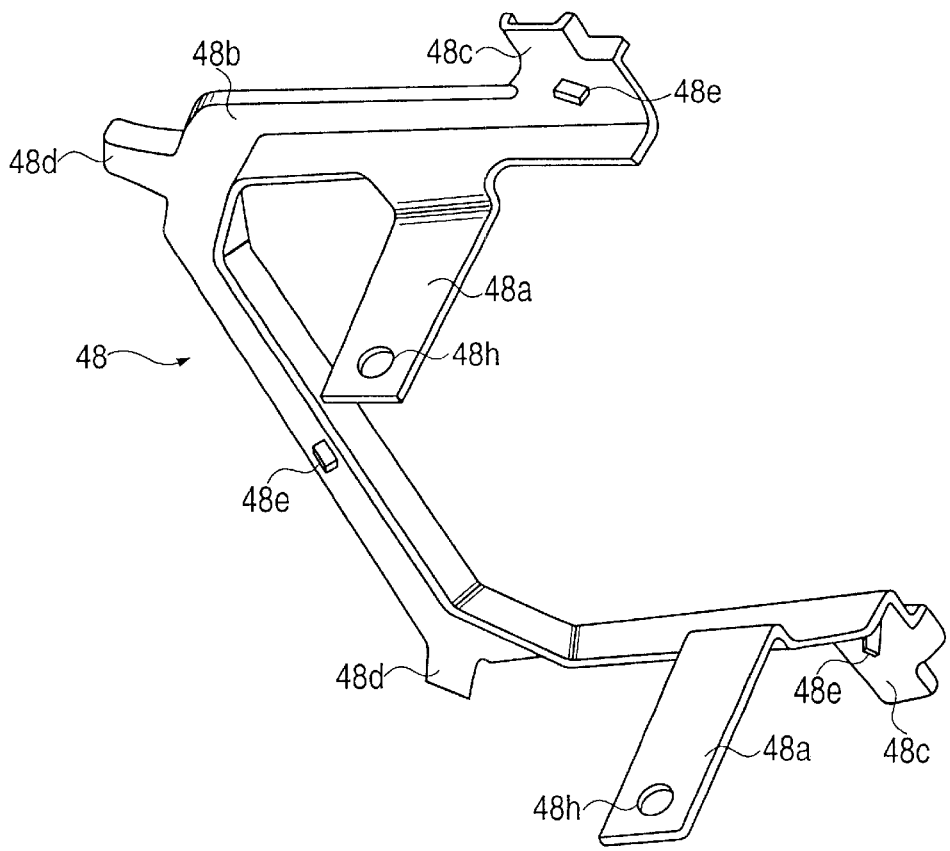
FIG. 11 is a perspective view of a horn switch supporting member.
Figure 12:
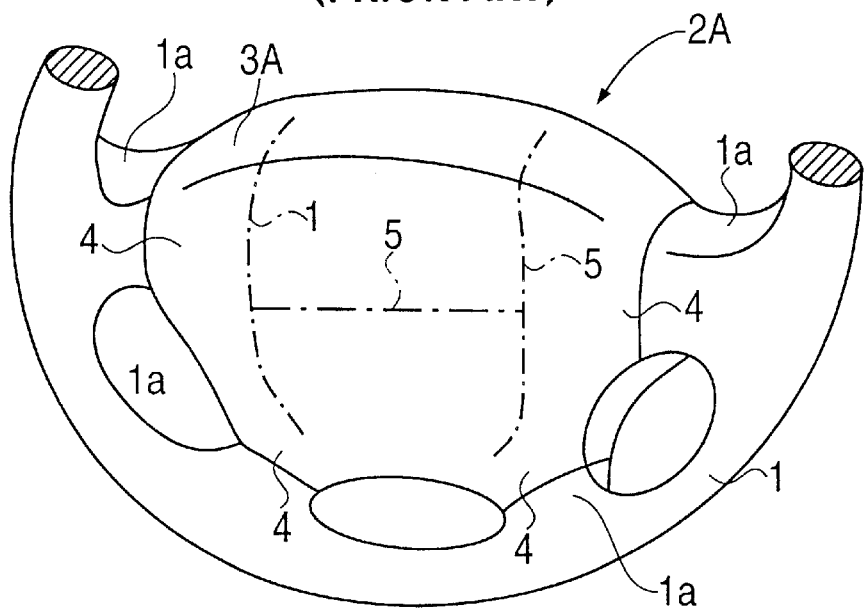
FIG. 12 is a perspective view of a conventional steering wheel.
Figure 13:
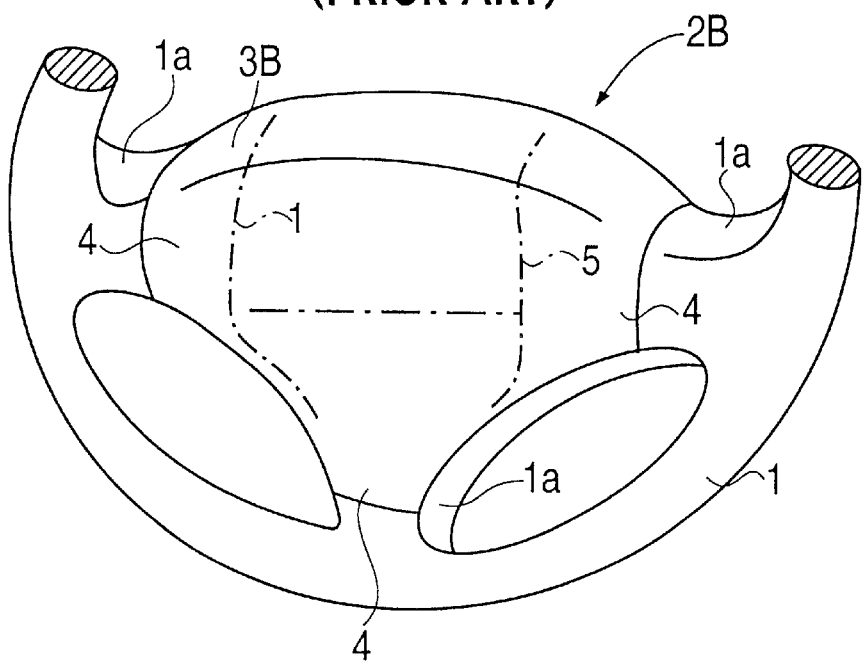
FIG. 13 is a perspective view of another conventional steering wheel.

A horn switch supporter 48 is provided with base portions 48a, and the retainer 42 is provided with protruding tabs 49 which extend from the bottom surface thereof. The base portions 48a and the protruding tabs 49 are fixed to a bracket (not shown) of the steering wheel with bolts. As shown in FIG. 11, the horn switch supporter 48 has an angular U-shape so as to surround the retainer 42 at three sides thereof. A top portion 48b of the horn switch supporter 48 faces the bottom surface of the module cover 45 at the periphery thereof, and extends in a plane perpendicular to the moving direction of the module cover 45.

The top portion 48b is provided with protruding portions 48c which extend toward the right and left, and protruding portions 48d which extend toward the lower right and lower left. In the descriptions hereof, "right" and "left" refer to directions as seen from a driver when a vehicle is moved forward. The protruding portions 48c and 48d are engaged with step portions which are provided to the steering wheel.

Horn switches 60, which will be described below, are disposed at the protruding portions 48c, and another horn switch 60 is disposed between the protruding portions 48d. Reference numeral 48e indicates openings 48e for attaching the horn switches 60.

The horn switch supporter 48 is disposed in a manner such that the three sides thereof extends along the right side, the left side, and the lower side (side facing the driver), of the retainer 42. In addition, the horn switch supporter 48 is provided with base portions 48a at two sides, which extend along the right side and the left side of the retainer 42. The base portions 48a and the protruding tabs 49 are provided with openings 48h and 49h, respectively, for receiving bolts. The bolts which penetrate through the openings holes 48h and 49h are screwed into tapped holes formed in the bracket (not shown) of the steering wheel.

There is a predetermined clearance between the module cover 45 and the shape-maintaining member (not shown) for maintaining the shape of the folded air bag 43. In addition, there is also a predetermined clearance between the hook portions 42F and the openings 45a formed in the leg portions 45L of the module cover 45. Accordingly, the module cover 45 is able to move in the vertical direction in FIG. 8. When the module cover 45 is pressed, one or more of the horn switches 60 are triggered and a horn is activated.

Each of the horn switches 60 includes a movable terminal (contacting member) 61, a coil spring 62, and a guide shaft 63 which is disposed inside the coil spring 62.

The contacting member 61 includes a clip portion 61a to which a rib, which projects from the bottom surface of the module cover 45, is fitted. The contacting member 61 also includes a contacting point 66, which is formed as a protrusion, and an opening (guide hole) 61h for inserting the guide shaft 63 therethrough. A head portion 63a of the guide shaft 63 is restrained by the contacting member 61. When the module cover 45 is pressed, the contacting point 66 contacts the top portion 48b of the horn switch supporter 48. Thus, the horn switch 60 is triggered and the horn is activated.

The guide shaft 63 includes the head portion 63a, which is restrained by the contacting member 61, and a pair of elastic leg portions 63b, which are restrained by the opening 48e formed in the top portion 48b of the horn switch supporter 48.

The three horn switches 60 are arranged in a similar manner to the above-described horn switches 10 and 30. In addition, with respect to each of the horn switches 60, the opening (guide hole) 61h is formed as an oblong hole, and extends in a direction similar to the opening (guide hole) 11c and 33h of the horn switch 10 and 30.

In the air bag apparatus 41 having the above-described construction, the module cover 45 also moves smoothly when it is pressed. In addition, in each of the horn switches 60, the opening (guide hole) 61h and the guide shaft 63 are engaged with each other. Thus, the module cover 45 is positioned with high accuracy.

As described above, according to the present invention, the air bag apparatus or the module cover moves smoothly, and is positioned with high accuracy. In addition, since three horn switches are provided in the present invention, forces applied by the springs are easily adjusted in the process of attaching the air bag apparatus to the steering wheel.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A driver-seat air bag apparatus contained in a steering wheel, comprising three horn switches which are circularly disposed at three positions in said steering wheel, each of said horn switches including:

a movable member which is provided with an opening and a contacting point, wherein the movable member is configured to move when the airbag is pressed in a direction in which said air bag is pressed;

a guide shaft positioned to pass through said opening and which guides the movement of said movable member; and a biasing member which applies biasing force to said movable member in a direction opposite to the direction in which said air bag is pressed, wherein said opening in each of said horn switches is formed as an oblong hole extending perpendicularly to a line which passes through the other two horn switches.

2. A driver-seat air bag apparatus contained in a steering wheel, comprising three horn switches which are circularly disposed at three positions in said steering wheel, each of said horn switches including:

a movable member provided with a contacting point, and configured to move when said air bag apparatus is pressed, in a direction in which said air bag is pressed;

a guide shaft which is fixed to said movable member and configured to move along with said movable member;

a fixed portion which is provided with an opening through which said guide shaft is inserted; and a biasing member biasing said movable member in a direction opposite to the direction in which said air bag is pressed, wherein said opening in each of said horn switches is formed as an oblong hole extending perpendicularly to a line which passes through the other two horn switches.

3. An airbag apparatus installed in a steering wheel comprising:

three horn switches activated by movement of an airbag cover away from a driver area;

wherein each of the switches include a fixed contact and a movable terminal; and wherein one of the switches is configured to limit movement of the moveable terminal to a direction away from the driver area and a direction perpendicular to a line which passes through the other two horn switches.

4. The apparatus of claim 3, wherein the fixed contact and movable terminal are biased apart.

5. The apparatus of claim 3, wherein the movable terminal is connected to the airbag cover.

6. The apparatus of claim 3, further comprising an airbag connected to the movable cover.

7. The apparatus of claim 3, wherein the airbag is stationary during operation of the switch.

8. The apparatus of claim 3, wherein each of the horn switches are located so that a circular line passes through each switch.

9. The apparatus of claim 3, wherein the one of the switches includes a guide shaft.

10. The apparatus of claim 9, wherein the guide shaft is connected to the fixed contact for guiding the movement of the movable terminal.

11. An airbag apparatus installed in a steering wheel comprising:

three horn switches activated by movement of an airbag cover away from a driver area;

wherein each of the switches include a fixed contact and a movable terminal;

wherein one of the switches is configured to limit movement of the movable terminal to a direction away from the driver area and a direction perpendicular to a line between the other two horn switches;

wherein the one of the switches includes a guide shaft connected to the fixed contact for guiding the movement of the movable terminal; and wherein the guide shaft passes through an opening in the movable terminal, and wherein the opening extends in a direction substantially perpendicular to the line between the other two switches to thereby limit the movement of the movable terminal.

12. The apparatus of claim 9, wherein the guide shaft is connected to the movable terminal.

13. The apparatus of claim 9, wherein the guide shaft passes through an opening in a plate supporting the fixed contact, and wherein the opening extends in the direction substantially perpendicular to the line which passes through the other two switches to thereby limit the movement of the movable terminal.

* * * * *